US012599112B2

(12) United States Patent
  Cheung

(10) Patent No.: US 12,599,112 B2
(45) Date of Patent: Apr. 14, 2026

(54) PET FEEDING MACHINE

(71) Applicant: Hong Ting Cheung, Hong Kong (CN)

(72) Inventor: Hong Ting Cheung, Hong Kong (CN)

( * ) Notice: Subject to any disclaimer, the term of this patent is extended or adjusted under 35 U.S.C. 154(b) by 0 days.

(21) Appl. No.: 18/821,563

(22) Filed: Aug. 30, 2024

(65) Prior Publication Data

US 2026/0060208 A1      Mar. 5, 2026

(51) Int. Cl.
  *A01K 5/02*      (2006.01)

(52) U.S. Cl.
  CPC .......... *A01K 5/0283* (2013.01); *A01K 5/0258* (2013.01)

(58) Field of Classification Search
  CPC ................................ A01K 5/0258; A01K 5/02
  See application file for complete search history.

(56) References Cited

U.S. PATENT DOCUMENTS 4,735,171 A  *  4/1988  Essex .................... A01K 5/0291
                                                         119/56.2
4,916,775 A  *  4/1990  Gallant .................. A22C 29/04
                                                         452/14

FOREIGN PATENT DOCUMENTS

| CN | 113197114 A | * | 8/2021 | .......... A01K 5/0291 |
| CN | 217905706 U | * | 11/2022 | |
| CN | 220274820 U | * | 1/2024 | .......... A23N 17/005 |

* cited by examiner

*Primary Examiner* — Christopher D Hutchens
(74) *Attorney, Agent, or Firm* — Muncy, Geissler, Olds & Lowe, P.C.

(57)                ABSTRACT

A pet feeding machine includes at least a fresh storage container with temperature control, the outlet of the fresh storage container being connected to a pre-heated container for heating up food; the pet food is placed in the fresh storage container for storage, and when feeding, the food is pushed to the pre-heated container according to the amount of feeding and then heated up to feed the pet. The fresh storage containers can be cooled to maintain a proper storage temperature inside to remain fresh of the food stored inside, especially fresh meat, etc. When it is time to feed, the food in the fresh storage containers will be fed into the pre-heated containers in the feeding volume, and then be heated properly to room temperature, and then the warmed food will be fed to the pets.

9 Claims, 3 Drawing Sheets

PET FEEDING MACHINE

FIELD OF THE INVENTION

The present invention relates to a device for automatically feeding pets, in particular to a feeding device for preparing, storing and feeding fresh meat to pets.

BACKGROUND OF THE INVENTION

A busy life brings different kinds of pressure to urbanites both physically and mentally, causing a lot of disturbances. So, keeping pets has many benefits as followings:

Companionship and emotional support: pets are loyal companions that provide unconditional love and companionship. Keeping pets can alleviate loneliness and provide emotional support you need. They can build up deep connections with people and become an important part of your life.

Reduce stress and increase happiness: research shows that spending time with pets can reduce stress and anxiety and increase happiness and happiness. Petting, playing with, and observing their active behaviors can release physical and mental stress and bring feelings of relaxation and joy.

Improve mental health: keeping pets is good for your mental health. Interaction with the pets can reduce symptoms of depression, lower blood pressure and heart rate, and increase social interaction and self-esteem. They can also provide emotional security and help reduce stress and anxiety.

Promote exercise and activity: many pets require regular exercise and activity. Keeping pets can encourage you to be more active in outdoor activities, such as walking, jogging or playing. These activities are good for your health and fitness and also strengthen the relationship between you and your pets.

Social Opportunities: keeping pets can bring you social opportunities. When you walk your dog or attend a pet community event, you can interact with other pet owners, share experiences and build new friendships. Your pet can also become a topic of conversation between you and others, facilitating communication and interaction.

Learn Responsibility and Empathy: keeping pets requires responsibility and learning to take care of their basic needs which develops responsibility, time management, and empathy. In caring for pets, you will become attentive to their needs and well-being, and learn to care and be compassionate.

Improve family relationships: pets can be a connection between family members and enhance family relationships. Caring for a pet with a family member promotes cooperation and teamwork, and provides topics and activities of interest.

However, for the busy life of urbanites, it is difficult to feed pets regularly. A pet feeder is a device that can automatically feed pets, and provide timely and accurate feeding so that the owner does not have to stay home all the time to take care of the pet's dietary needs. Here are some common pet feeder features and how they operate:

Timed feeding: the pet feeder usually has a timed feeding function that can automatically offer food according to a preset schedule. You can set the number of feedings per day and the amount of food each time.

Food storage capacity: the capacity of feeders varies by brand and model. Some feeders have large food storage tanks that can hold several days' worth of food, while others are smaller and need to be replenished frequently.

Feeding method: generally, the pet feeder uses gravity or electric machinery to deliver food. Gravity feeders usually pour food into a container and then feed it to your pet through an open outlet. Electromechanical feeders use a motor to push a feeding plate or auger to distribute food to designated locations.

Feeding Control: Some feeders have advanced feeding control features. For example, you can adjust the amount of food delivered each time based on your pet's weight and food needs, or set a specific time period for feeding.

Animal feed is mainly dry food, followed by some pre-made canned food. It is a good choice for busy urbanites raising animals.

Nowadays, the feeders in the market are mainly based on dry food, but in recent years, some pet owners have advocated feeding raw meat. However, for the busy owners, handling and storing fresh meat food will be difficult to a certain extent.

Raw meat feeding (also called raw food feeding or BARF feeding) is a kind of feeding that provides pet with raw meat, bones, organs, and other natural ingredients. Here are some of the possible benefits of raw meat feeding:

Being closer to a natural diet: raw meat feeding imitates the dietary pattern of wild animals and provides a option that is closer to the natural diet of animals. This diet usually contain raw meat, bones, organs, and other natural ingredients, similar to what wild animals would get in their natural environment.

Being rich in nutrients: raw meat feeding provides a rich source of nutrients. Raw meat high in protein, fat, amino acids and essential fatty acids. Bones provide calcium and other minerals, while organ are rich in vitamins and trace minerals.

Structural stimulation: raw meat feeding provide structural stimulation as the pet needs to gnaw on bones, tear pieces of meat, and use its bite muscles to eat. This helps keep the mouth and teeth healthy and promotes chewing movements.

Improvement of Gut Health: Some advocates believe that raw meat feeding may improve gut health. Raw meat contains natural enzymes and probiotics which may help to balance the intestinal flora and reduce digestive problems and allergic reactions.

While raw meat feeding has its supporters, there are some potential risks and cautions:

Nutritional balance: raw meat feeding requires careful planning and nutritionally balanced. It is important to make sure your animal is getting enough protein, fats, carbohydrates, vitamins and minerals. Consult your veterinarian or pet nutritionist to ensure you are providing a diet that meets your pet's nutritional needs.

Food safety: Raw meat may contain pathogenic bacteria (e.g. *Salmonella, E. coli*, etc.) which may pose health risks to humans and animals. Appropriate food safety measures, such as choosing quality suppliers, paying attention to hygiene, and proper handling and storage of raw meat, can minimize these risks.

SUMMARY OF THE INVENTION

The present invention provides a pet feeding machine, which can automatically complete the processing of fresh meat as pet food, such as preservation and feeding control, and is easy to use.

The present invention achieves the goals by the following technical solutions:

A pet feeding machine comprising a fresh storage container with temperature control, and an outlet of the fresh storage container being connected to a preheated storage container for heating food; pet food is stored in the fresh storage container; and feed the pet by pushing the pet food into the preheated storage container for heating according to the feeding amount of food consumed.

Further, the fresh storage container is connected to a refrigeration device, and the refrigeration device is controlled at a set temperature range.

Further, the preheated storage container is connected to a heating device, and the heating device is controlled at a set temperature range.

Further, a food crushing device is provided, and the outlet of the food crushing device is connected to the inlet of the fresh storage container or the food crushing device is placed in the fresh storage container.

Further, the food crushing device comprises a feed screw and a crushing cutter set positioned at the end of the feed screw.

Further, a stirring device is provided and is a spiral stirring paddle installed in the fresh storage container.

Further, a gate for closing the fresh storage container is provided between the fresh storage container and the preheated storage container and at the inlet of the fresh storage container.

Further, the stirring device is provided with a plurality of stirring sticks.

Further, the outlet of the preheated storage container is provided with a feeding tray and a weight sensor for food weighting is provided at the bottom of the feeding tray.

Further, the fresh storage container is provided with a refrigeration device, and the preheated storage container is provided with a heating device; the refrigeration device and heating device include pipelines respectively connected to a cold end and a hot end of a compressor air conditioner, and the pipelines are provided with fluid valves to control the opening and closing of the pipelines.

The beneficial effects of the present invention are: the fresh storage containers can be cooled to maintain a proper storage temperature inside to ensure that the food stored inside stays fresh, especially fresh meat, etc. When it is time to feed, the food in the fresh storage containers will be fed into the preheated storage containers according to the feeding volume, and the food will be properly heated, generally to room temperature, and then the warmed food will be fed to the pet. The device is able to automatically process, preserve and feed the fresh meat food, which is convenient to use.

BRIEF DESCRIPTION OF THE DRAWINGS

The present invention will be further described below in conjunction with the accompanying drawings.

DESCRIPTION OF THE EMBODIMENTS

Figure 1:
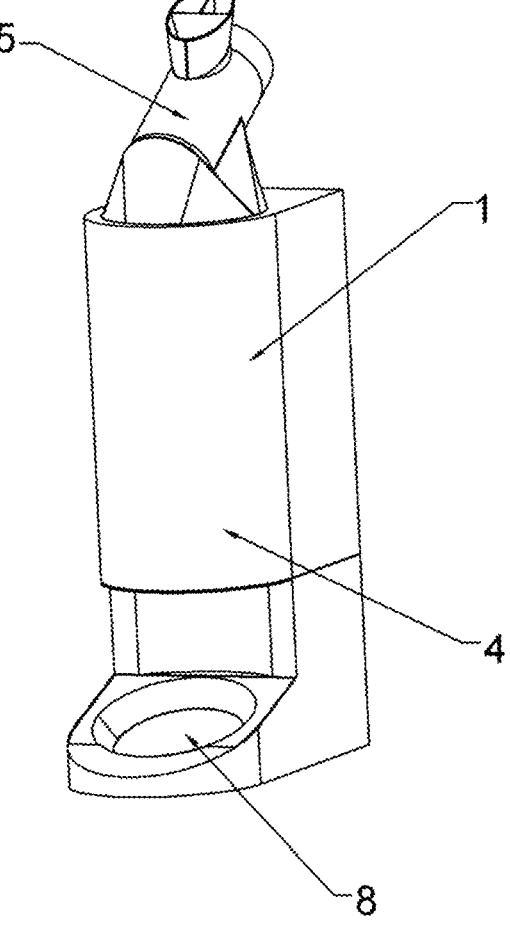
FIG. 1 is a perspective vies of the present invention.
Figure 2:
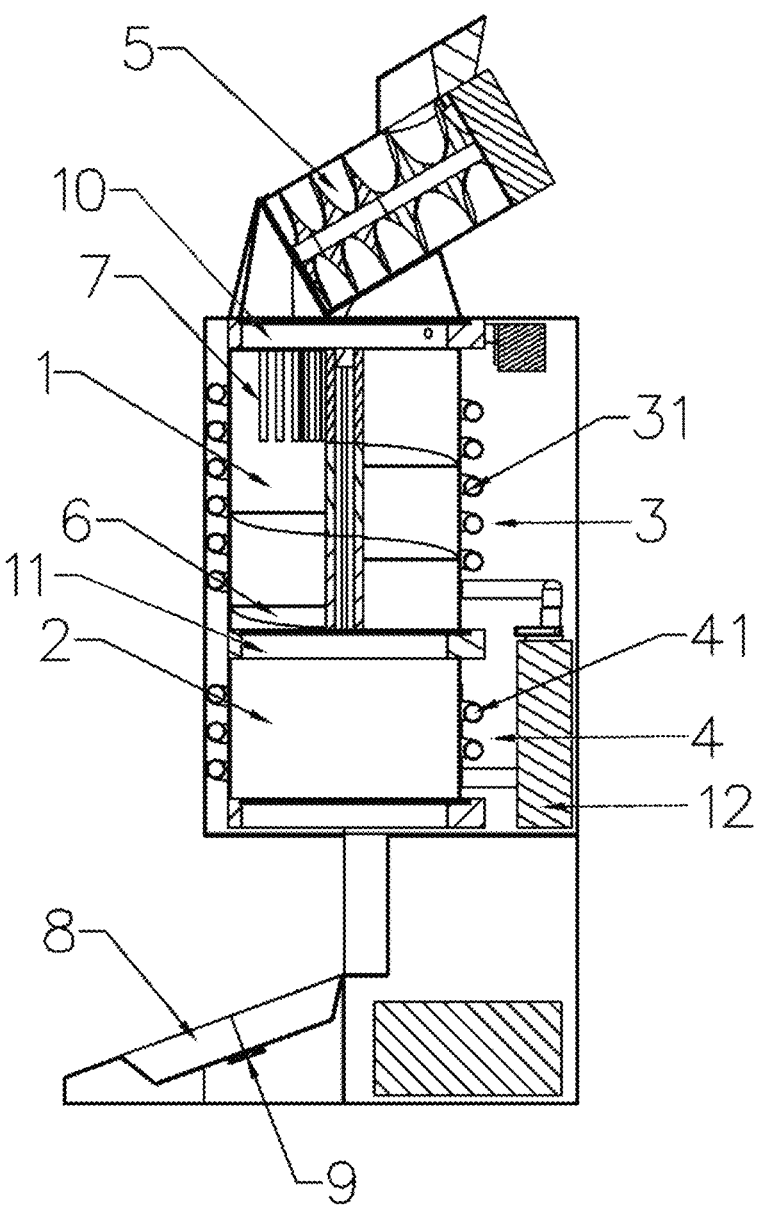
FIG. 2 is a section vies of the present invention.
Figure 3:
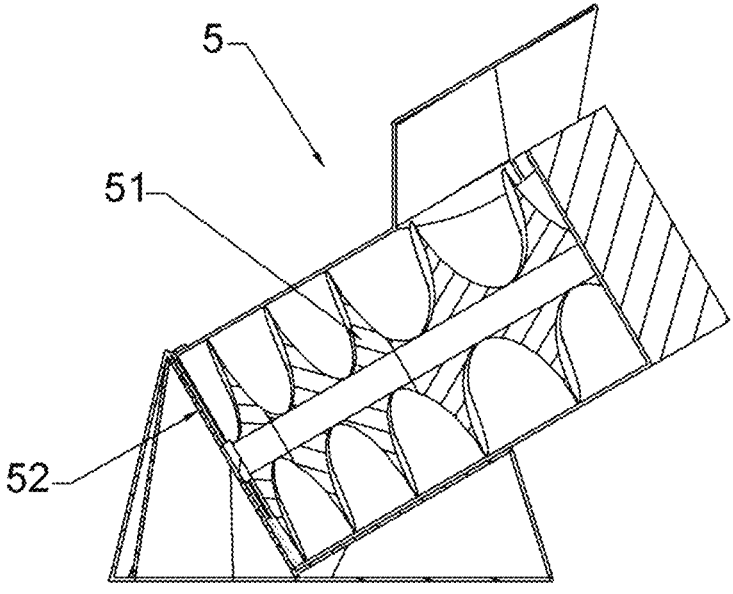
FIG. 3 is a section vies of the crushing device.

As shown in FIG. 1, the pet feeder is composed of three main parts, namely a food processor, a storage container and a feeder.

The food processor consists of a food crushing device 5 and a stirring device 6, which are mainly composed of the meat mixing part and a meat stirring part which mixing with nutritional additives. The preparation of the fresh meal is carried out by the food crushing device 5 to crushing the fresh meat, which consists of a feed screw 51 and a crushing cutter set 52 at the end of the feed screw 51; the fresh meat is fed into the feed screw 51, which is then pushed to the crushing cutter set 52 at a set speed to cut and chop the fresh meat. By setting the speed of the feed screw 51, the degree of mincing of the meat can be adjusted, slow speed means finer minced meat, fast speed means bigger meat. In the mixing section, there is a nutritional powder input port, which will quantitatively feed the nutritional powder into the food mixing device 5 and mixing device 6, and then pump in the appropriate amount of water to mix with the minced meat. In order to further mix the crushing meat with the nutritional additives, a plurality of stirring sticks 7 are also provided in the stirring device 6.

The storage container consists of two parts, the fresh storage container 1 and the preheated storage container 2. The fresh storage container 1 is provided with a refrigeration device 3, and the preheated storage container 2 is provided with a heating device 4. The refrigeration device 3 and heating device 4 include pipelines 31, 41 respectively connected to a cold end and a hot end of a compressor air conditioner 12.

The stirred fresh meat is pushed into the fresh storage container 1. Since the fresh meat will be prone to spoilage and bacterial growth in the high temperature and air environment, it is necessary to realize the sealing and refrigeration of the fresh storage container 1. So, gates 10, 11 are provided at the inlet and outlet of the fresh storage container 1, respectively, to seal the fresh storage container 1. When all the fresh meat is fed into the fresh storage container 1, the gates 10, 11 of the fresh storage container 1 will be closed, and then the air will be extracted from the container by a pump to maintain a vacuum inside. An air pressure sensor is provided to monitoring the pressure whether it reaches the set air pressure value, then the pump will be shut down. Once the air pressure of the fresh storage container 1 changes, the pump will turn on to maintain the air pressure of the fresh storage container 1 at the set value.

In addition, to keep the temperature inside the fresh storage container 1 appropriately low so as to maintain the freshness of the fresh meat, the refrigeration device 3 is provided, which is condenser (or other refrigeration device) and a refrigeration medium. The pipeline 31 of the refrigeration device 3 surrounds the container with refrigeration medium flow inside, thus cools down the fresh storage container 1. The temperature of the fresh storage container 1 is controlled at 4-5° C. by setting a temperature inside to achieve the proper storage temperature to minimize the growth of bacteria. The spiral stirring paddle of the fresh storage container 1 is rotated at regular intervals so that the fresh meat inside can be stirred properly.

When it is time to feed, the air valve in the fresh storage container 1 is opened to allow the air pressure inside to return to normal. And by the rotation of the spiral stirring paddle, the machine will automatically squeeze the preset portion of fresh meat from the fresh storage container 1 to the preheated storage container 2, while the heating device 4, specifically the heat energy released by the refrigeration device 3, heats up the preheated storage container 2 by the pipeline 41 surrounding the preheated storage container 2 and flowing with heat medium inside to thaw the fresh meat food. The temperature of the preheated storage container 2 is controlled by a temperature sensor inside the preheated storage container 2, and the fresh meat food is then heated up to a suitable temperature.

At a preset time, the gate of the preheated storage container 2 will be opened and the fresh meat will fall onto the feeding tray 8 of the feeder, and the pets will be able to eat from the feeding tray 8, thus achieving the purpose of fresh meat feeding. And there is a weight sensor 9 at the bottom of the feeding tray 8 to record the amount and time of the meal. This allows the pet owner to know the eating habit of the pet.

The invention claimed is:

1. A pet feeding machine comprising a fresh storage container with temperature control, and an outlet of the fresh storage container being connected to a preheated storage container for heating food; pet food is stored in the fresh storage container; and feed the pet by pushing the pet food into the preheated storage container for heating according to the feeding amount of food consumed;

wherein the fresh storage container is connected to a refrigeration device, and the preheated storage container is connected to a heating device; the refrigeration device and heating device include pipelines respectively surrounding the fresh storage container and the preheated storage container, the pipelines of the refrigeration device and heating device are respectively connected to a cold end and a hot end of a compressor air conditioner.

2. The pet feeding machine of claim 1, wherein the refrigeration device is controlled at a set temperature range.

3. The pet feeding machine of claim 1, wherein the heating device is controlled at a set temperature range.

4. The pet feeding machine of claim 1, wherein a food crushing device is provided, and the outlet of the food crushing device is connected to the inlet of the fresh storage container or the food crushing device is placed in the fresh storage container.

5. The pet feeding machine of claim 4, wherein the food crushing device comprises a feed screw and a crushing cutter set positioned at the end of the feed screw.

6. The pet feeding machine of claim 1, wherein a stirring device is provided and is a spiral stirring paddle installed in the fresh storage container.

7. The pet feeding machine of claim 6, wherein the stirring device is provided with a plurality of stirring sticks.

8. The pet feeding machine of claim 1, wherein gates for closing the fresh storage container is provided between the fresh storage container and the preheated storage container and at the inlet of the fresh storage container.

9. The pet feeding machine of claim 1, wherein the outlet of the preheated storage container is provided with a feeding tray and a weight sensor for food weighing is provided at the bottom of the feeding tray.

\* \* \* \* \*